Jan. 6, 1970   D. L. NOLEN   3,488,081
FLOOR MAT
Filed May 18, 1967   2 Sheets-Sheet 1
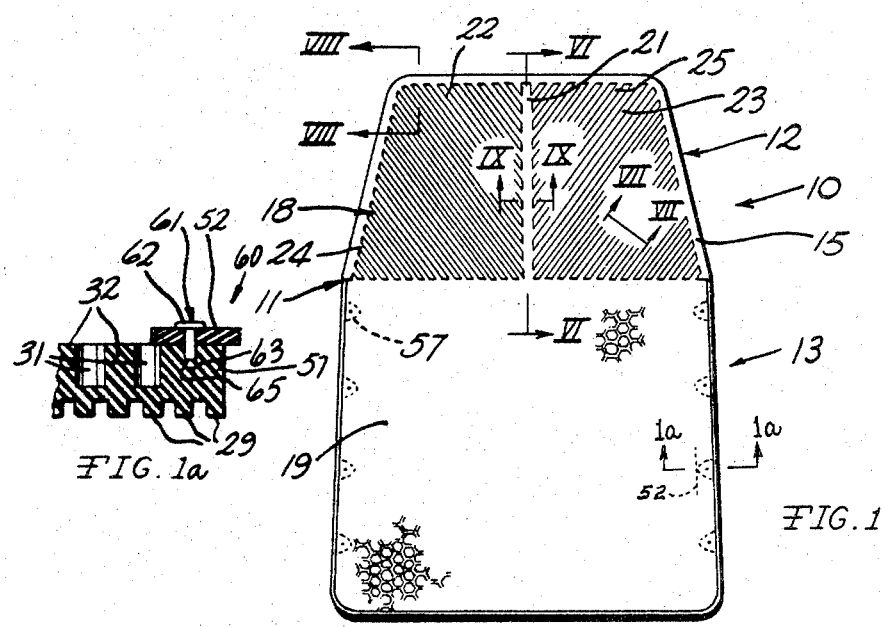
FIG. 1a
FIG. 1
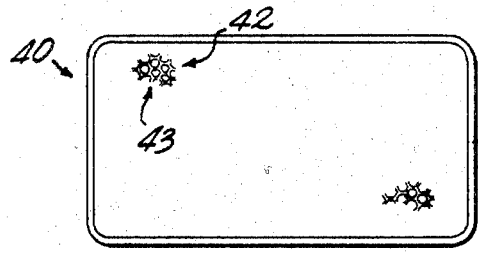
FIG. 4
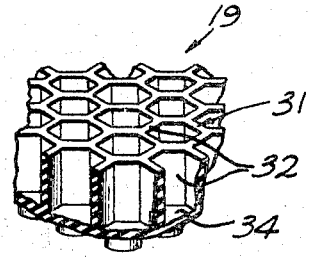
FIG. 2
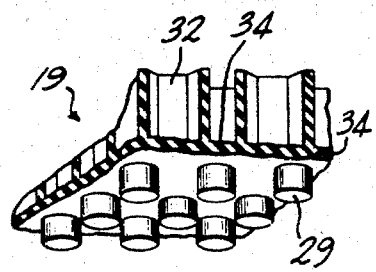
FIG. 3
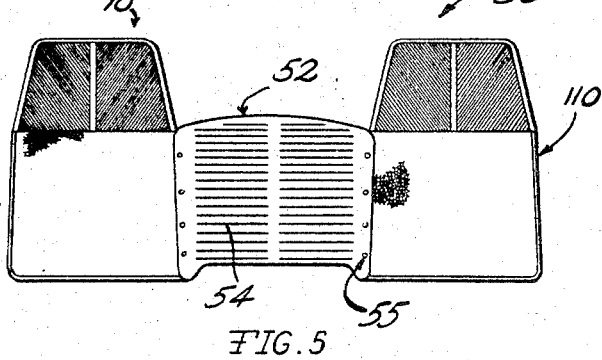
FIG. 5
INVENTOR
DAVID L. NOLEN
BY Roy A. Plant
ATTORNEY Jan. 6, 1970  D. L. NOLEN  3,488,081
FLOOR MAT
Filed May 18, 1967  2 Sheets-Sheet 2

INVENTOR
DAVID L. NOLEN
BY Roy A. Plant
ATTORNEY

United States Patent Office 3,488,081
Patented Jan. 6, 1970

3,488,081
FLOOR MAT
David L. Nolen, Olivet, Mich.
(22800 14½ Mile Road, Rte. 1, Bellevue, Mich. 48111)
Filed May 18, 1967, Ser. No. 639,486
Int. Cl. B60n 3/04
U.S. Cl. 296—1        7 Claims

ABSTRACT OF THE DISCLOSURE

This invention resides in a floor mat member for use as a dust, dirt and moisture collector by providing a trough draining surface for the inclined portion of an automobile's front seat floor which drains moisture into a honeycombed styled mat surface that provides individual moisture collecting pockets and with the additional provision of bottom projections extending from the bottom of the floor mat member which can hold the floor mat member up from the automobile floor covering permitting some circulation of air between the bottom of the floor mat member and the automobile floor covering.

---

This invention relates broadly to a floor mat, and more specifically to an automobile floor mat member adapted for collecting, receiving and storing moisture which has been brought into the automobile by its users.

Over the years the automobile has been adapted and used in an endless variety of capacities and at any time of the year or day. All the time the automobile is in use the life and appearance of its various parts are important. Because of this the automobile manufacturers have adopted the procedure of providing automotive floor carpeting almost universally on new automobiles. This is evident in every style including convertibles, station wagons, standard passenger automobiles, et cetera. The use of automotive floor carpeting provides an additional problem to the owners and users of cars, both for appearance and the removal of water, dirt and mud tracked into the automobile. The adaptation of a mat which will help prevent water from being absorbed into the automobile carpeting material has developed into a problem. Because of the trapping of water under the automotive floor carpeting many times the floor will rust out of the vehicle. At other times because of the automotive floor carpeting trapping water, mildewing may take place on the non-synthetic yarn materials or other material used in the carpeting or adjacent the carpeting. The present practice is to provide automotive floor mats which tend to meet the need of collecting the mud, dirt and grit brought in by the users. However, no satisfactory solution has been presented for handling these items, and also collecting the residue of water and moisture brought into the automobile by the user. The water and moisture are particularly noticetable during fishing and hunting trips, swimming outings, salesmen continually getting into and out of their automobiles during inclement weather, small children riding in the vehicle, and the normal use which a vehicle sustains when operating around and in water and moisture areas.

Accordingly, among the objects of the present invention is the provision of an automobile floor mat which is designed to collect water residue carried in by the automobile user.

Another object is to provide a novel means in the form of a floor mat to provide a collection system of water and moisture residue which will provide for air circulation below the bottom surface of a floor mat and also prevent undesired shifting of the floor mat during use.

A further object of the present invention is to provide a floor mat structure which can be easily positioned in and easily removed from the vehicle and of a design which is of such a shape that it can be used on either the right or left side of the vehicle floor with provision to be assembled into a unitary assembly having a transmission housing cover for the front seat or drive shaft housing cover for the back seat.

Still further objects and advantages of the present invention will appear as the description proceeds.

To the accomplishment of the foregoing and related ends, the invention, then, consists of a floor mat assembly having a honeycombed floor mat base surface as hereinafter fully described and particularly pointed out in the claims, annexed drawings and the following description setting forth in detail certain means for carrying out the invention, such disclosed means illustrating, however, but one of various ways in which the principle of the invention may be used.

In the annexed drawings:

FIGURE 1 is a top plan view of an automotive floor mat member illustrating the principles of the present invention.

FIGURE 1a is a partial enlarged end sectional view of the automotive floor mat member taken along line 1a—1a of FIGURE 1 and illustrating the principles of the present invention by showing a transmission housing snapped into engagement with the floor mat.

FIGURE 2 is a partial sectional top perspective view displaying the principles of the present invention as illustrated in FIGURE 1 and specifically showing the makeup of the honeycombed mat surface.

FIGURE 3 is a partial sectional perspective bottom view displaying the principles of the present invention as illustrated in FIGURES 1 and 2 and specifically showing the makeup of the bottom projections.

FIGURE 4 is a top plan view of an alternate floor mat for an automobile with honeycombed mat surface illustrating the principles of the present invention and similar to the floor mats shown in FIGURES 1 and 2.

FIGURE 5 is a top plan view illustrating an automotive floor cover assembly having two front floor mats, as shown in FIGURE 1, connected by a transmission housing cover.

Figure 11:
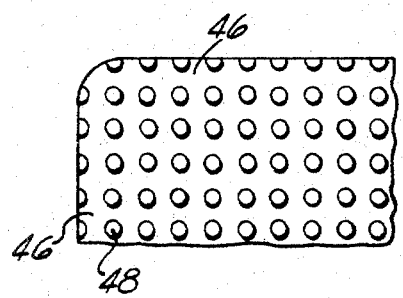
FIGURE 11 is a partial bottom view of the alternate floor mat for an automobile illustrated in FIGURE 10.

FIGURE 1 illustrates an automotive front seat floor mat generally referred to as 10. Front seat floor mat 10 has an outer rib dam 11, a firewall portion 12 and a floor portion 13. The firewall portion 12 and the floor portion 13 are inherently joined together, as will be explained in more detail below. The outer rib dam 11 has an upper edge 15 extending around the outer periphery of firewall portion 12. The outer rib dam 11 has a lower edge 16 which extends around the outer periphery of the floor portion 13.

In the preferred embodiment as illustrated in FIGURE 1, the floor portion 13 will be positioned on the floor in a horizontal level and the firewall portion 12 will extend from floor portion 13 on an upward angle incline. Firewall portion 12 has a trough surface 18 and floor portion 13 has a honeycombed mat surface 19. The firewall portion 12 is provided with a main drain trough 21 which extends substantially from the top of front floor mat 10 through the length of firewall portion 12 to the edge of floor portion 13. Side drain troughs 22 on the left side of firewall portion 12 and side drain troughs 23 on the right side are cut diagonally across the trough surface 18 to drain into main drain trough 21 and into the honeycombed mat surface 19 of floor portion 13 as is illustrated in FIGURE 1. Side drain troughs 22 and 23 of trough surface 18 are divided from their adjacent troughs by a series of ribs 24 and 25, respectively.

Figure 6:
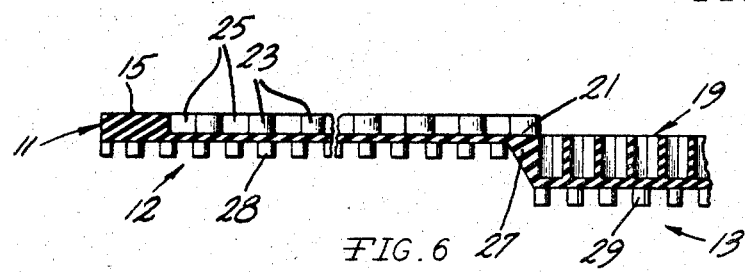
FIGURE 6 is a partial sectional view illustrating the principles of the present invention and showing the connective relationship of the firewall portion and the floor portion of the front floor mat taken along line VI—VI of FIGURE 1.

Referring to FIGURE 6, the upper edge 15 of outer rib dam 11 is shown at the end of main drain trough 21 and ribs 25 are shown separating the adjacent side drain troughs 23. The firewall portion 12 is connected to the floor portion 13 by a connecting rib 27. As illustrated in FIGURE 6, the connecting rib 27 is of a substantially triangular shape. The material of the front floor mat 10 could be of various products but a flexible characteristic would be desired in a preferred embodiment. Examples of suggested products for use as the material would be rubber or plastic which permit bending and conforming to the floor of the various automobile floors. The preferred embodiment shows a connecting rib which will easily permit the firewall portion 12 to be raised at an angle from the floor portion 13. The side drain troughs 22 and 23 and the main drain trough 21 are positioned to drain into the floor portion 13 at the edge of honeycombed mat surface 19 adjacent firewall portion 12.

Referring to FIGURE 1, it is clearly shown that the major portion of the water and moisture which would be received by the firewall portion 12 will drain from the side drain troughs 22 and 23 into the main drain trough 21 and then proceed down main drain trough 21 to the honeycombed mat surface 19 of floor portion 13. The side drain troughs 22 and 23 which do not lead into the main drain trough 21 will drain directly into the honeycombed mat surface 19 of the floor portion 13. This construction will provide that the larger portion of the water drained onto the front floor mat 10 will pass to the central portion of the honeycombed mat surface 19 adjacent firewall portion 12; thus the water will fill up in the center and pass to the outer honeycomb cups as will be explained in more detail below.

The firewall portion 12 has a series of bottom projections 28 and the floor portion 13 has a series of body projections 29. These bottom projections 28 and 29 tend to hold the front floor mat 10 up above the floor surface, in the present case automobile carpeting is illustrated, permitting air to circulate underneath the floor mat 10 and evaporate any water or moisture which would have drained or collected underneath the floor mat 10 and not have been collected by or received by the honeycombed mat surface 19.

Referring to FIGURE 2, the top portion of the honeycombed mat surface 19 is illustrated in detail. The honeycombed mat surface 19 is made up of a series of interconnected hexagon cups 31. These hexagon cups 31 are provided with side walls 32 and terminate at their base on a bottom member 34. FIGURE 3 is a view of a bottom portion of part of the floor portion 13 showing the honeycombed mat surface 19 and its bottom member 34 along with their side walls 32, and the series of bottom projections 29.

Figure 7:
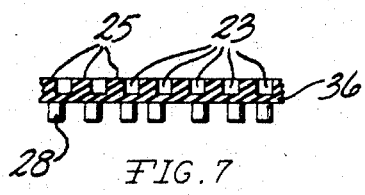
FIGURE 7 is a partial sectional view illustrating the principles of the present invention and showing side trough portion taken along line VII—VII of FIGURE 1.
Figure 8:
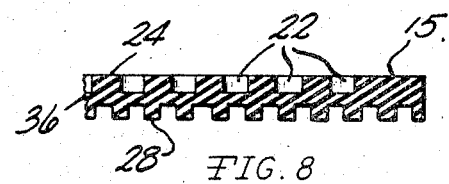
FIGURE 8 is a partial sectional view illustrating the principles of the present invention and showing the diagonal side drain troughs and their connections to the upper edge of the outer rib dam taken along line VIII—VIII of FIGURE 1.
Figure 9:
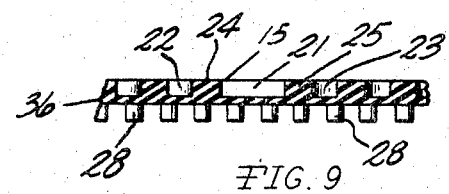
FIGURE 9 is a partial sectional view illustrating the principles of the present invention and showing the side drain troughs coming into the main drain trough taken along line IX—IX of FIGURE 1.

Referring generally to FIGURE 7, there is an illustration of the firewall portion 12 showing the bottom projections 28 connected to its bottom member 36. The bottom member 36 is the bottom portion of side drain troughs 22 and 23 and ribs 24 and 25 and connect them together. FIGURE 8 shows the bottom member 36 with the bottom projections 28 in cross section connected to its underside and illustrates ribs 24 in cross section connected to its upper side. The bottom projections 28 are shown connected to the bottom side of upper edge 15 of outer rib dam 11. FIGURE 9 illustrates bottom member 36 connecting ribs 24 and 25 and side drain troughs 22 and 23 to the main drain trough 21 and the bottom member 36 acts as the bottom of main drain trough 21 as well as the bottom for side drain troughs 22 and 23. Also, the ribs 24 and 25 and the side drain troughs 22 and 23 are shown connected to the bottom member 36 along with bottom projections 28.

Generally referring to FIGURE 4, we have an alternate floor mat 40 having an outer edge 41 which surrounds the outer periphery of the back floor mat 40. The major surface of the alternate floor mat 40 is made up with a honeycombed mat surface 42. The floor mat 40 is designed generally for use in the back seats of automobiles. The honeycombed mat surface 42 has a series of individual hexagon cups 43. The construction of the honeycombed mat surface 42 and the individual hexagon cups 43 are similar in details to honeycombed mat surface 19 and hexagon cups 31, respectively, as illustrated in FIGURES 2 and 3.

Figure 10:
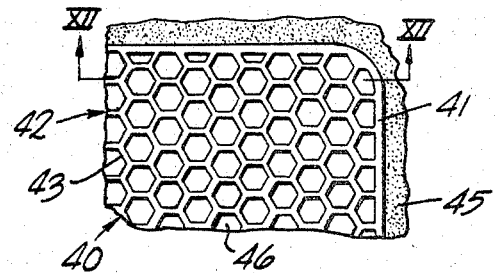
FIGURE 10 is a partial enlarged top plan view of the alternate floor mat for an automobile as illustrated in FIGURE 4 illustrating the floor mat being supported by an automotive carpet member.

Referring to FIGURES 10 and 11, the alternate floor mat 40 is illustrated at its upper right corner, as viewed in FIGURE 4, after it has been positioned on automobile carpeting generally indicated as 45. The outer edge 41 extends around the outer circumference of honeycombed mat surface 42 with the individual hexagon cups 43 making up the surface. The individual hexagon cups 43 terminate at a bottom member 46 which is similar in its function to the bottom member 36 as illustrated in FIGURES 2 and 3. A series of bottom projections 48 extend downward from the bottom member 46 to perform a function similar to the bottom projections 28 and 29 on firewall portion 12 and floor portion 13, respectively, as illustrated in FIGURE 1.

Figure 12:
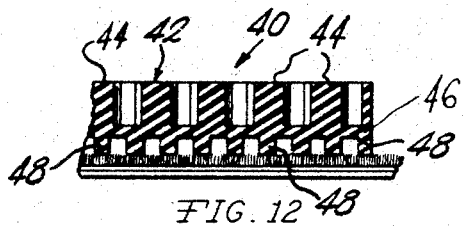
FIGURE 12 is a partial end sectional view illustrating the honeycombed mat surface structure supported on an automotive carpet member taken along line XII—XII of FIGURE 10.

Referring to FIGURE 12, there is illustrated the back floor mat 40 with its honeycombed mat surface 42 with the side walls 44 and outer edge 41 being illustrated in section. The bottom projections 48 are illustrated supporting the back floor mat 40 off the automobile carpeting 45 which permits air to circulate underneath the back floor mat 40 removing any water or moisture which may have been caught or collected under the bottom member 46 of the floor mat 40.

Referring to FIGURE 5, there is illustrated an automotive floor cover assembly 50 which is made up of a front floor mat 10 on the left side and a front floor mat 110 on the right side for illustrative purposes. A transmission housing cover 52 is provided between and connects the front floor mat 10 and front floor mat 110. The transmission housing cover 52 is provided with drain guides 54 the purpose and function of which will be explained in more detail below. The transmission housing cover 52 can connect the front floor mats 10 and 110 in various manners. Securing means 55 are illustrated in the present invention. This could include rivets, bonding, staples or hexagon pegs to fit into the hexagon cups 31, et cetera, depending upon the application and the manufacturer's preference.

Referring to FIGURES 1 and 1a, there is shown one means for snap connecting which could be utilized to secure the front floor mats 10 and 110 together forming a floor cover assembly 50. For this embodiment snap blocks 57 could be provided on the floor portion 13. The construction of the snap blocks 57 will be explained in more detail below. If a floor mat is to be universal, in other words, be able to be used on either the right or the left sides, the snap blocks 57 would be provided on both sides of the floor portion 13 adjacent the lower edge 16 as illustrated in FIGURE 1 in phantom. Referring to FIGURE 1a, a snap securing means 60 is illustrated. The transmission housing cover 52 is provided with snap members 61, one being shown. The snap member 61 has a snap head 62 and a snap end 63 which extends through the transmission housing cover 52. The snap block 57 of floor portion 13 has a snap pocket 65. The snap pocket 65 receives the snap end 63 of snap member 61, securing that portion of the front floor mat 10 to that portion of the transmission housing cover 52; thus, the front floor mat 10 can be easily removed from the transmission housing cover 52 when it is desired to take the floor cover assembly 50 out of the automobile.

It should be noted that the end of the transmission housing cover 52 extends over the edge of the lower edge 16 and permits the draining of any water or moisture coming from the drain guide 54 of the transmission housing cover 52 to pass into the hexagon cups 31. Although not shown, from the above explanation it can be easily understood how a drive shaft housing cover could be provided connecting two back floor mat members 40 together when desired or necessary to form an alternate floor cover assembly.

One of the prime functions of this inventive device is to permit individual receiving units or mats to absorb the water or moisture off the feet of individual passengers in vehicles, permitting this water or moisture to be captured so it can be removed without damage to the automobile floor and particularly the automotive carpeting. At the same time the units or mats are to provide an attractive type of appearance which can function desirably under all use conditions.

Examples of the size of the floor mat 10 would be to have the lower edge 16 approximately 1/16 of an inch wide, the upper edge 15 approximately 1/2 of an inch wide, the floor portion 13 would have a total depth of approximately 1/2 inch, the bottom projections 29 would extend approximately 1/8 of an inch below the bottom member 34. The side walls 32, it is contemplated, could be 1/16 of an inch thick. These, of course, are just illustrative figures and are not intended to limit the scope of the invention.

From the foregoing it will be seen that a novel construction has been disclosed for simply and economically attaining the desired ends. However, attention is again invited to the possibility of making variations in the spirit and scope of the invention as shown in the drawings and described in the specification.

Other modes of applying the principle of my invention may be employed, instead of those explained, change being made as regards the individual articles and combinations herein disclosed, provided the means stated by any of the following claims or the equivalent of such stated means be employed.

I therefore particularly point out and distinctly claim as my invention:

1. A flexible floor mat assembly comprising, in combination
   (a) a floor mat,
   (b) an outer rib dam substantially around the outer circumference of said floor mat,
   (c) an upper mat surface within said outer rib dam,
   (d) a bottom member connecting said outer rib dam and said upper mat surface,
   (e) individual cup members as part of said upper mat surface and extending up from said bottom member,
   (f) bottom projections extending down from said bottom member,
   (g) side wall members forming said cup members,
   (h) said side wall connecting cup members to said outer rib dam,
   (i) said bottom member acting with said side wall members to give said cup members a moisture collecting characteristic,
   (j) two said floor mats,
   (k) a cover member connecting said two floor mats,
   (l) securing means securing said cover member to said floor mats,
   (m) at least one snap block mounted on each of said floor mats,
   (n) snap members connected to said cover member,
   (o) said snap members having snap ends,
   (p) said snap blocks having snap pockets to receive said snap ends, and
   (q) the edges of said cover member adjacent said floor portions extending over said outer rib dams.

2. A floor mat assembly comprising, in combination
   (a) a floor mat,
   (b) said floor mat having a firewall portion and a floor portion,
   (c) a connecting rib connecting said firewall portion and said floor portion,
   (d) an outer rib dam substantially around the outer circumference of said floor mat,
   (e) said floor portion having a surface portion,
   (f) said surface portion having a series of individual cup members,
   (g) said firewall portion having a trough surface,
   (h) a main drain trough extending from the upper portion of said firewall portion to said floor portion,
   (i) side drain troughs extending from the sides of said firewall portion towards said main drain trough,
   (j) bottom projections extending from the bottom of said floor mat,
   (k) a bottom member connecting said outer rib dam to said cup member,
   (l) side wall members forming said cup members and connecting to said outer rib dam,
   (m) said bottom member acting with said side wall members to give said cup members a moisture collecting characteristic,
   (n) two said floor mats,
   (o) a cover member connecting said two floor mat assemblies,
   (p) securing means securing said cover member to said floor mats,
   (q) at least one snap block mounted on said floor portions adjacent said outer rib portions,
   (r) at least two snap members as part of said cover member,
   (s) said snap members having snap ends,
   (t) said snap blocks having snap pockets to receive said snap ends, and
   (u) the edges of said cover member adjacent said floor portions extending over said outer rib dam.

3. A floor mat assembly comprising, in combination
   (a) a first floor mat,
   (b) an outer rib dam substantially extending around the outer circumference of said floor mat,
   (c) a connecting rib extending across said first floor mat,
   (d) a firewall portion of one side of said connecting rib,
   (e) a floor portion on the other side of said connecting rib,
   (f) a first bottom member as part of said firewall portion and connecting said outer rib dam and said connecting rib,
   (g) a second bottom member as part of said floor portion and connecting said outer rib dam and said connecting rib,
   (h) trough ribs on said first bottom member extending diagonally from the top and sides of said firewall portion towards said connecting rib forming side drain troughs,
(i) said trough ribs terminating before reaching the center of said firewall portion forming a main drain trough extending from the top portion of said outer rib dam to said connecting rib substantially in the middle of said firewall portion,
(j) a honeycomb mat surface on said second bottom member,
(k) individual hexagon cups forming said honeycomb mate surface,
(l) interconnecting side walls extending from said second bottom member and forming said hexagon cups and connecting them to said outer rib dam and said connecting rib, and
(m) bottom projections extending from the bottom of said first and second bottom members.

4. A floor mat assembly as defined in claim 3, having
(a) said first bottom member connected substantially to the top of said connecting rib,
(b) said second bottom member connected substantially to the bottom of said connecting rib, and
(c) said connecting rib extending at least as high as said side walls.

5. A floor mat assembly as defined in claim 4, having
(a) at least one snap block extending from said outer rib dam into said honeycomb mat surface, and
(b) a snap pocket provided in said snap block.

6. A floor mat assembly as defined in claim 5, having
(a) a second floor mat similar to said first floor mat,
(b) a cover member,
(c) at least two snap ends as part of said cover member, and
(d) said snap ends being received by said snap pocket to connect said cover member to said first and second floor mats.

7. A floor mat assembly as defined in claim 6, having
(a) the edges of said cover member adjacent said first and second floor mats extending over said outer rib dam, and
(b) drain guides extending from the mid-portion of said cover member towards said first and second floor mats.

References Cited

UNITED STATES PATENTS

| | | | |
|---|---|---|---|
| 3,129,972 | 4/1964 | Vodra | 296—1 |
| 3,337,258 | 8/1967 | Stewberg | 296—1 |
| 2,604,377 | 7/1952 | Eames | 15—238 X |
| 2,810,672 | 10/1957 | Taylor | 296—1 |
| 2,667,654 | 2/1954 | Peterson | 15—215 |

PHILIP GOODMAN, Primary Examiner

U.S. Cl. X.R.

15—215